US012748276B2

(12) United States Patent
Abdulsalam et al.

(10) Patent No.: US 12,748,276 B2
(45) Date of Patent: Sep. 29, 2026

(54) CABLE CASSETTE WITH SELF-LOCKING MOUNTING FEATURE STRUCTURALLY CONFIGURED TO PROVIDE ENHANCED ACCESS TO A LOWER CASSETTE

(71) Applicant: PPC BROADBAND, INC., East Syracuse, NY (US)

(72) Inventors: Afzal V. Abdulsalam, Edathala (IN); Sreekumar Ponnath, Palakkad (IN)

(73) Assignee: PPC BROADBAND, INC

( * ) Notice: Subject to any disclaimer, the term of this patent is extended or adjusted under 35 U.S.C. 154(b) by 227 days.

(21) Appl. No.: 18/517,219

(22) Filed: Nov. 22, 2023

(65) Prior Publication Data

US 2024/0168250 A1 May 23, 2024

Related U.S. Application Data

(60) Provisional application No. 63/427,383, filed on Nov. 22, 2022.

(51) Int. Cl.
*G02B 6/44* (2006.01)
*G02B 6/38* (2006.01)

(52) U.S. Cl.
CPC ......... *G02B 6/4454* (2013.01); *G02B 6/3897* (2013.01)

(58) Field of Classification Search
CPC ............................ G02B 6/4454; G02B 6/3897
See application file for complete search history.

(56) References Cited

U.S. PATENT DOCUMENTS 6,449,418 B1 9/2002 Brocheton
11,275,226 B2 * 3/2022 Claessens ............ G02B 6/4455
2015/0168663 A1 6/2015 Aznag et al.
2021/0055496 A1 * 2/2021 Allen ................. G02B 6/44528
2023/0085572 A1 * 3/2023 Bryon et al. ......... G02B 6/4442 385/135

FOREIGN PATENT DOCUMENTS

EP 2538257 A1 12/2012
WO 2021165322 A2 8/2021

OTHER PUBLICATIONS

International Search Report and Written Opinion mailed Feb. 26, 2024 in corresponding International Application No. PCT/US2023/080860, 18 pages.

* cited by examiner

*Primary Examiner* — Sung H Pak
(74) *Attorney, Agent, or Firm* — MH2 Technology Law Group LLP

(57) ABSTRACT

An optical fiber management portion includes: a pivot portion that is structurally configured to rotate relative to a pivot portion receiving portion such that the optical fiber management portion is configured to pivot between a raised position and a lowered position; and a locking portion that is structurally configured to be retained by a locking portion receiving portion to retain the optical fiber management portion in the raised position. The pivot portion receiving portion may be structurally configured to be identical to the locking portion receiving portion; and the pivot portion and the locking portion may be structurally configured to cooperate to provide a positioning mechanism that may be structurally configured to hold the optical fiber management portion in the raised position so as to provide enhanced access to a second optical fiber management portion positioned underneath the optical fiber management portion.

31 Claims, 10 Drawing Sheets

CABLE CASSETTE WITH SELF-LOCKING MOUNTING FEATURE STRUCTURALLY CONFIGURED TO PROVIDE ENHANCED ACCESS TO A LOWER CASSETTE

CROSS-REFERENCE TO RELATED APPLICATION

This application claims the benefit of U.S. Provisional Application No. 63/427,383 filed Nov. 22, 2022, the disclosure of which is hereby incorporated by reference herein in its entirety.

BACKGROUND

The present invention relates generally to optical fiber cable management. More particularly, the present invention relates to a self-locking mounting system for holding modules or cassettes in an upper or open position.

Conventional systems do not provide cable management modules or cassettes that include a system for securely holding a heavy module of cassette in an up or open position. There is a need for a system for holding a heavy module or cassette in a position that allows access to a module or cassette in a position below the subject module or cassette.

It may be desirable to provide a hinged cassette, module, or splice tray with a positioning mechanism for securing the cassette, module, or splice tray in the up position so as to permit access to a cassette, module, or splice tray underneath. It may be desirable to provide a locking feature that is configured to fit in a standard layout of a support plate.

SUMMARY

The present disclosure provides a much needed fiber optic management module or cassette with self-locking mounting feature that holds the module or cassette in an up or open position. Embodiments of the disclosure are compatible with particular back plates, which allows mix-and match, easy migration, and upgrades. Embodiments include self-locking pivoting cassettes to facilitate access to a cassette below or under the subject cassette.

Embodiments include a cassette having a connection member that has a pivot member and a locking member. The cassette pivots from a down position to an up position about an axis that extends through the pivot member. When the cassette is in the up position, the locking member clips into, or otherwise removably engages, a resilient receiving portion of a module/cassette mounting plate.

Embodiments provide a locking mechanism that securely holds a relatively heavy module/cassette in an up position so that a second module/cassette below the subject module/cassette can be accessed by a technician.

Embodiments provide a fiber optic cable cassette that may be structurally configured to provide enhanced access to a second cassette, including: a cassette body portion structurally configured to receive an adapter portion; a connection portion structurally configured to couple a cassette with a cassette mounting portion such that the cassette is configured to pivot relative to the cassette mounting portion; and an adapter portion comprising an optical connector that is structurally configured to optically connect a first optical cable to a second optical cable. The connection portion may comprise a pivot portion that may be structurally configured to be received in a pivot portion receiving portion of the cassette mounting portion; the pivot portion may be structurally configured to rotate relative to the pivot portion receiving portion such that the cassette may be configured to pivot between a raised position and a lowered position; the pivot portion may be structurally configured to have a rectangular cross-sectional shape that may be structurally configured to be received by a pair of retaining portions of the pivot portion receiving portion; the connection portion may comprise a locking portion that may be structurally configured to be received in a locking portion receiving portion of the cassette mounting portion; the locking portion may be structurally configured to be retained by the locking portion receiving portion to retain the cassette in the raised position; the locking portion may be structurally configured to have a circular cross-sectional shape that may be structurally configured to be received by a pair of retaining portions of the locking portion receiving portion; the pivot portion receiving portion may be structurally configured to be identical to the locking portion receiving portion; and the pivot portion and the locking portion may be structurally configured to cooperate to provide a positioning mechanism that may be structurally configured to hold the cassette in the raised position so as to provide enhanced access to a second cassette positioned underneath the cassette.

In particular embodiments, the adapter portion may comprise an adapter plate.

In particular embodiments, the adapter portion may be one of a plurality of different adapter portions.

In particular embodiments, the cassette may further comprise a splice tray mounted to the cassette body portion and movable between an open position and a closed position.

In particular embodiments, the pivot portion comprises a pivot bar.

In particular embodiments, the rectangular cross-sectional shape of the pivot portion may be structurally configured as a square shape.

In particular embodiments, a first set of opposing sides of the pivot portion may be configured to be parallel to inner surfaces of the pivot portion receiving portion when the cassette is in the raised position, and a second set of opposing sides of the pivot portion may be configured to be parallel to inner surfaces of the pivot portion receiving portion when the cassette is in the lowered position.

In particular embodiments, the locking portion may comprise a locking bar.

In particular embodiments, the pivot portion receiving portion may comprise a first pair of retaining portions that may be structurally configured as first resilient mounting tabs, and a second pair of retaining portions that may be structurally configured as second resilient mounting tabs.

In particular embodiments, a downward turned end of an upper portion of the locking portion receiving portion may be structurally configured to contact the locking portion when the cassette is in the raised position, and an upward turned end of a lower portion of the locking portion receiving portion may be structurally configured to contact the locking portion when the cassette is in the raised position.

In particular embodiments, the adapter portion may be structurally configured to be removably attached to the cassette body portion.

In particular embodiments, the adapter portion may be structurally configured to receive an external input connector that may be structurally configured to receive an input cable located outside of the cassette, an internal input connector that may be structurally configured to receive an input cable located inside the cassette, an external output connector that may be structurally configured to receive an output cable located outside of the cassette, and an internal output connector that may be structurally configured to receive an output cable located inside the cassette.

Embodiments provide an optical fiber management portion that may be structurally configured to provide enhanced access to a second optical fiber management portion, including: a body portion that may be structurally configured to receive an adapter portion; and a connection portion that may be structurally configured to couple an optical fiber management portion with a mounting portion such that the optical fiber management portion may be configured to pivot relative to the mounting portion. The connection portion comprises a pivot portion that may be structurally configured to be received in a pivot portion receiving portion of the mounting portion; the pivot portion may be structurally configured to rotate relative to the pivot portion receiving portion such that the optical fiber management portion may be configured to pivot between a raised position and a lowered position; the connection portion may comprise a locking portion that may be structurally configured to be received in a locking portion receiving portion of the mounting portion; the locking portion may be structurally configured to be retained by the locking portion receiving portion to retain the optical fiber management portion in the raised position; the pivot portion receiving portion may be structurally configured to be identical to the locking portion receiving portion; and the pivot portion and the locking portion may be structurally configured to cooperate to provide a positioning mechanism that may be structurally configured to hold the optical fiber management portion in the raised position so as to provide enhanced access to a second optical fiber management portion positioned underneath the optical fiber management portion.

In particular embodiments, the body portion may be structurally configured to receive an adapter portion.

In particular embodiments, the adapter portion may comprise an optical connector that may be structurally configured to optically connect an internal optical cable to an external optical cable.

In particular embodiments, the pivot portion may comprise a pivot bar.

In particular embodiments, the pivot portion receiving portion may comprise a first pair of retaining portions.

In particular embodiments, the pivot portion may be structurally configured to have a rectangular cross-sectional shape.

In particular embodiments, the locking portion may comprise a locking bar.

In particular embodiments, the locking portion receiving portion may comprise a second pair of retaining portions.

In particular embodiments, the locking portion may be structurally configured to have a circular cross-sectional shape.

In particular embodiments, a first set of opposing sides of the pivot portion may be configured to be parallel to inner surfaces of the pivot portion receiving portion when the optical fiber management portion is in the raised position, and a second set of opposing sides of the pivot portion may be configured to be parallel to inner surfaces of the pivot portion receiving portion when the optical fiber management portion is in the lowered position.

In particular embodiments, the first pair of retaining portions may be structurally configured as first resilient mounting tabs, and the second pair of retaining portions may be structurally configured as second resilient mounting tabs.

Embodiments provide an optical fiber management portion including: a pivot portion that may be structurally configured to rotate relative to a pivot portion receiving portion such that the optical fiber management portion may be configured to pivot between a raised position and a lowered position; and a locking portion that may be structurally configured to be retained by a locking portion receiving portion to retain the optical fiber management portion in the raised position. The pivot portion receiving portion may be structurally configured to be identical to the locking portion receiving portion; and the pivot portion and the locking portion may be structurally configured to cooperate to provide a positioning mechanism that may be structurally configured to hold the optical fiber management portion in the raised position so as to provide enhanced access to a second optical fiber management portion positioned underneath the optical fiber management portion.

In particular embodiments, the pivot portion may comprise a pivot bar.

In particular embodiments, the pivot portion receiving portion may comprise a first pair of retaining portions.

In particular embodiments, the pivot portion may be structurally configured to have a rectangular cross-sectional shape.

In particular embodiments, the locking portion may comprise a locking bar.

In particular embodiments, the locking portion receiving portion may comprise a second pair of retaining portions.

In particular embodiments, the locking portion may be structurally configured to have a circular cross-sectional shape.

In particular embodiments, a first set of opposing sides of the pivot portion may be configured to be parallel to inner surfaces of the pivot portion receiving portion when the optical fiber management portion is in the raised position, and a second set of opposing sides of the pivot portion may be configured to be parallel to inner surfaces of the pivot portion receiving portion when the optical fiber management portion is in the lowered position Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments provide a pivot portion and a locking portion that may be structurally configured to cooperate to provide a positioning mechanism that may be structurally configured to hold a cassette in a raised position so as to provide enhanced access to a second cassette positioned underneath the cassette.

Embodiments of the disclosure provide an optical fiber management portion, for example, a module or cassette, for use in a modular and scalable platform for managing, storage and splicing of optical fibers. Embodiments provide a connection member having a locking mechanism that securely holds a relatively heavy module or cassette in an up position so that a second module or cassette below the subject module or cassette can be accessed by a technician. In this disclosure the term cassette will be used to represent a module or a cassette for use in optical fiber (or other cable) systems.

In embodiments, a combination of a pivot bar and a locking bar provides a secure positioning mechanism to secure the cassette in the up position.

Figure 1:
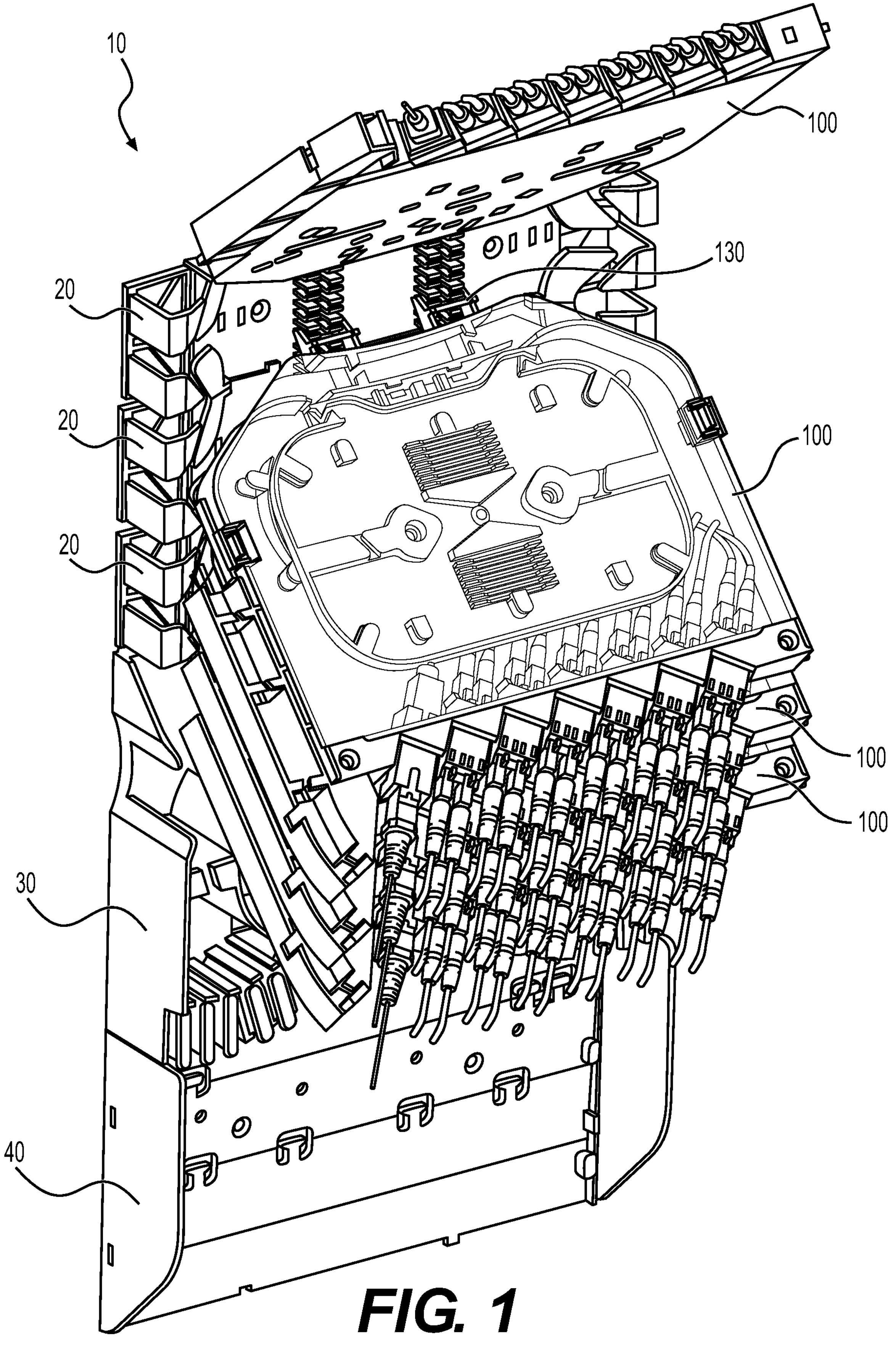
FIG. 1 is a front perspective view of an exemplary cable fixation, entry, storage, and splicing system in accordance with various aspects of the disclosure.
Figure 2:
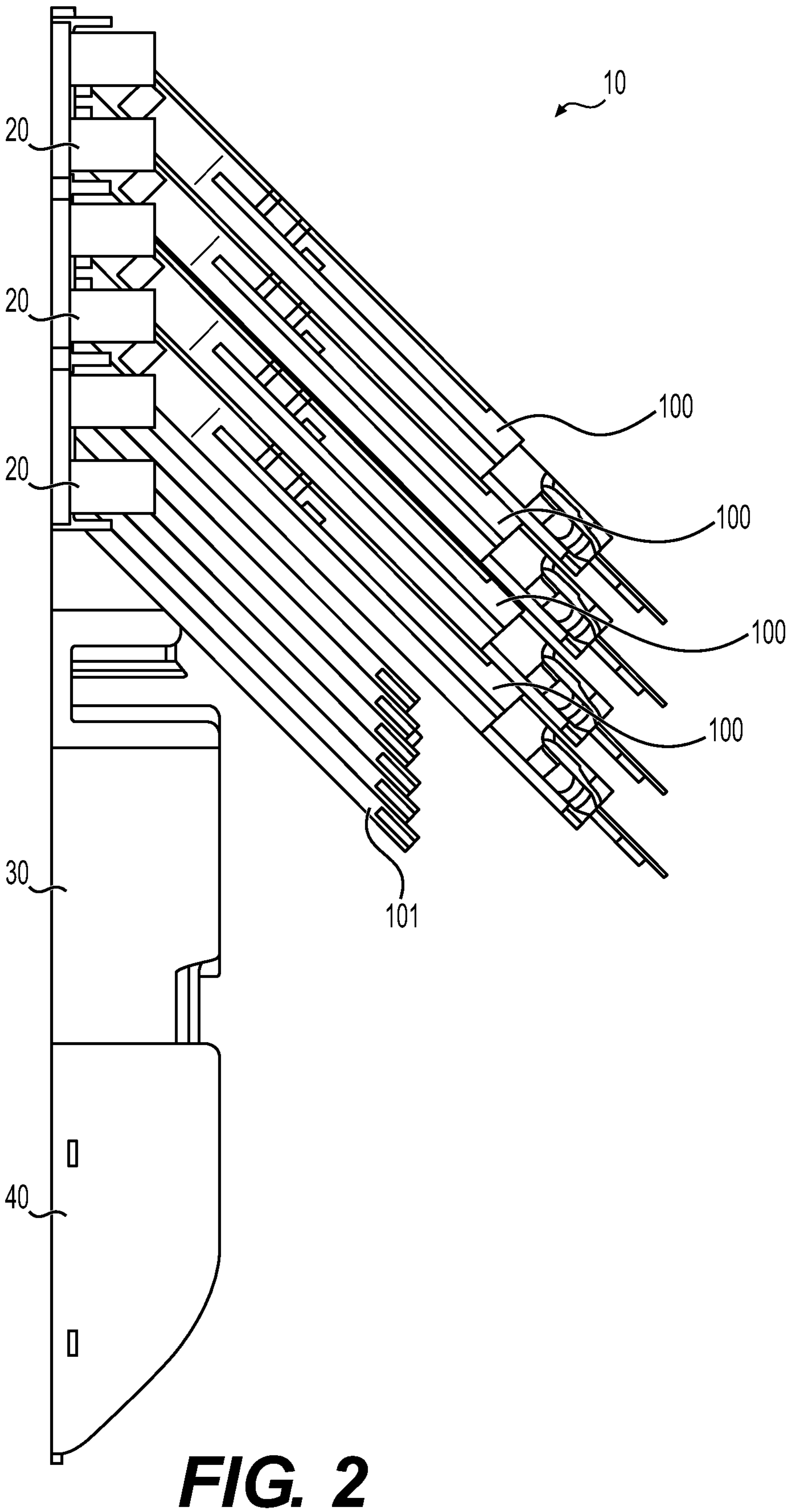
FIG. 2 is a side view of the cable fixation, entry, storage, and splicing system of FIG. 1.

FIGS. 1 and 2 show an exemplary optical fiber cable fixation, entry, storage, and splicing system 10 in accordance with embodiments of the disclosure. System 10 includes, in this example, a plurality of splice tray modules 101 and optical fiber management portions, for example, cassettes, 100. In this example, each cassette 100 has a splicing and fiber management area, and a connection portion, for example, two connection members, 130 that connect cassettes 100 to a mounting portion, for example, a cassette mounting portion or a module/cassette mounting plate, 20. This example includes three module/cassette mounting plates 20 to which splice tray modules 101 and cassettes 100 are pivotably mounted so that each splice tray module 101 and cassette 100 can be pivoted upward independently from the other splice tray modules 101 and cassettes 100. While this example uses three module/cassette mounting plates 20, other examples use fewer or more than three module/cassette mounting plates 20. This example includes a fiber entry and storage plate 30 that is mounted below, and connected to, a lower-most module/cassette mounting plate 20. This example includes a cable fixation plate 40 mounted below, and connected to, fiber entry and storage plate 30. In this example, each cassette 100 is a single layer cassette that is configured to receive a single layer of output connectors. In this example, each cassette 100 has one input connector that has one input cable. The various components of connection members 130 are discussed in detail below.

In some installment locations, multiple systems 10 are mounted beside each other and/or on top of one another (with or without an intervening mounting plate) to increase density within a cabinet or other panel. For example, a side wall of a first system 10 can be located adjacent to a side wall of another system 10, and/or a base plate of one system 10 can be mounted to an intervening mounting plate that is, in turn attached to a base plate of another system 10.

Figure 3:
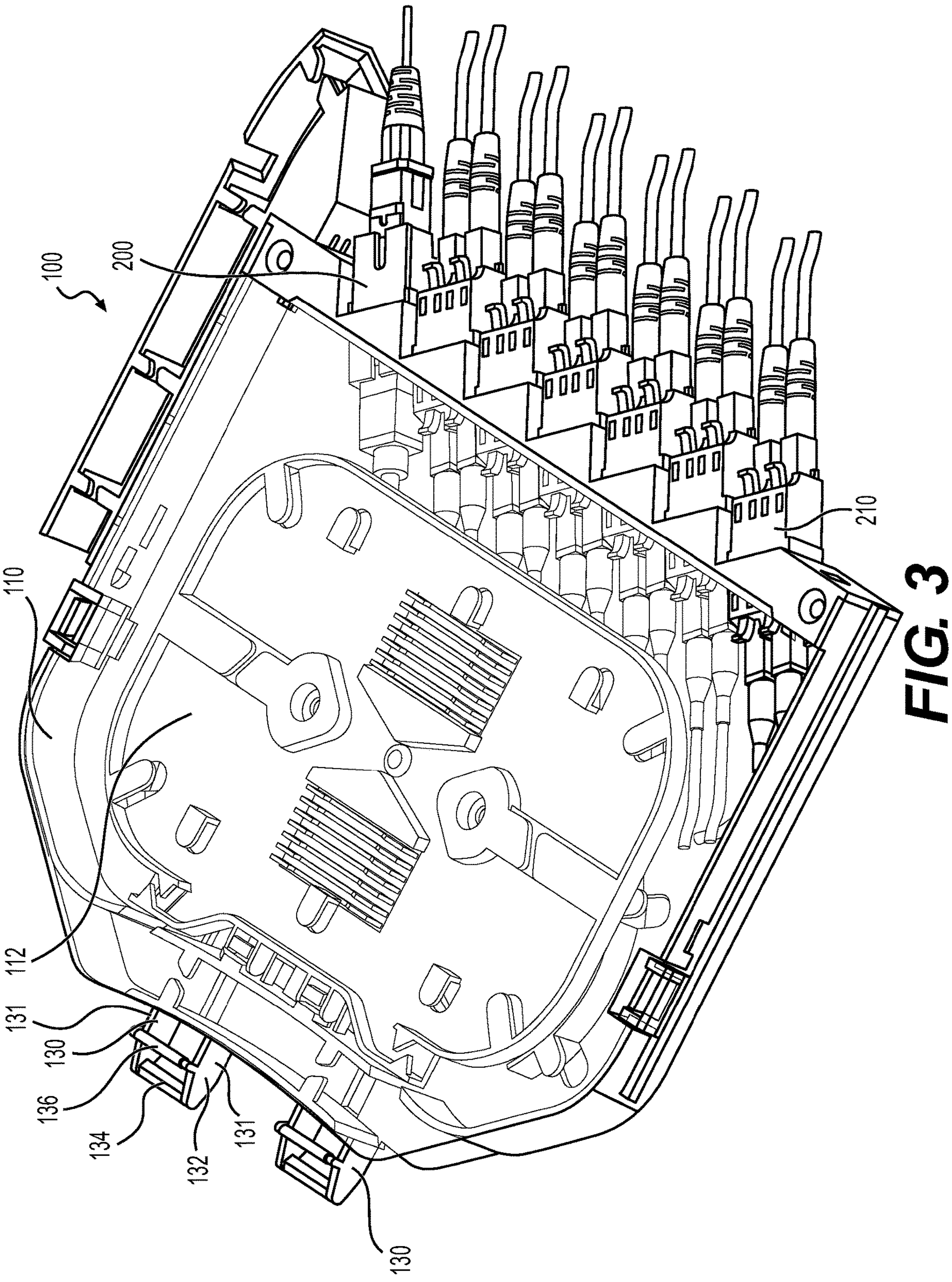
FIG. 3 is a perspective view of an exemplary cassette in accordance with various aspects of the disclosure.

FIG. 3 shows an exemplary cassette 100 having one input connector 200 and six output connectors 210 attached to a front end of cassette 100. Other embodiments have a different number of input connector 200 and output connector 210. In this example, cassette 100 has a body portion, for example, a cassette body portion, or a cassette base, 110 to which a splice tray 120 is mounted. In FIG. 2, splice tray 120 is shown in a closed position in which it covers a large portion of cassette base 110. In this example, output connectors 210 and input connector 200 are removably attached to an adapter portion, for example, an adapter plate. Also shown in FIG. 3 is a cable manager that is removably attached to a right side of cassette base 110. Other examples of cassette 100 use an adapter plate that is oriented in different configurations.

In the example shown in FIG. 3, cassette 100 has two connection members 130 that are used to connect cassette 100 to mounting plate 20 such that cassette 100 can pivot relative to mounting plate 20 between a lowered or down position (shown in FIGS. 5 and 6) and raised or up position (shown in FIGS. 7-10). In this example, connection member 130 has a pivot portion, for example, a pivot bar, 134 that extends between two side plates 131 of connection member 130. Pivot bar 134 remains connected to mounting plate 20 in both the up position and the down position. Cassette 100 pivots around an axis of pivot bar 134. In this example, connection member 130 has a locking portion, for example, a locking bar 136, that extends between the protrusions 132 of two side plates 131. Locking bar 136 is connected to mounting plate 20 in the up position, but is not connected to mounting plate 20 in the down position.

Figure 4:
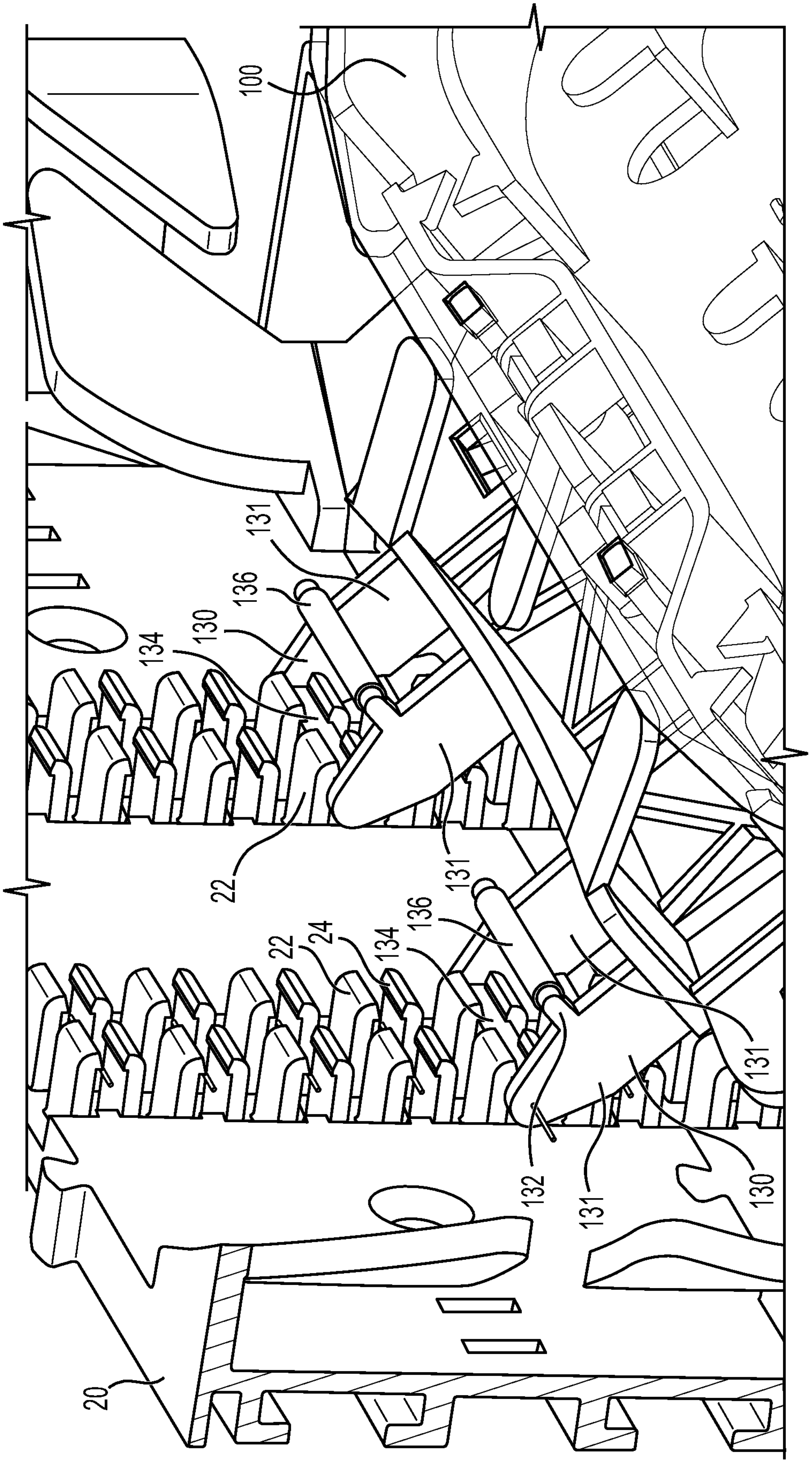
FIG. 4 is a perspective view of a mounting structure of the cassette of FIG. 3.

FIG. 4 is a perspective view of cassette 100 in the down position. In this position, pivot bar 132 of each of two connection members 130 of cassette 100 is attached to mounting plate 20. In this example, mounting plate 20 has four vertical rows of tabs 22, 24 that are provided to receive connection members 130. In particular, each pivot bar 134 is held between a pair of upper tabs, for example, resilient tabs, 22 and a pair of lower tabs, for example, resilient tabs, 24. In this example, each upper tab 22 has a downward turned end 23 and each lower tab 24 has an upward turned end 25 (best shown in FIG. 6). Tabs 22 and 24 are flexible and resilient such that downward turned ends 23 and upward turned ends 25 move away from each other as pivot bar 134 is pushed in to place between tabs 22 and 24. Cassette 100 can be removed from mounting plate 20 by pulling pivot bars 134 from between tabs 22 and 24. As shown in FIG. 4, mounting plate 20 has a plurality of positions in which one or more cassettes 100 can be installed on mounting plate 20.

Figure 5:
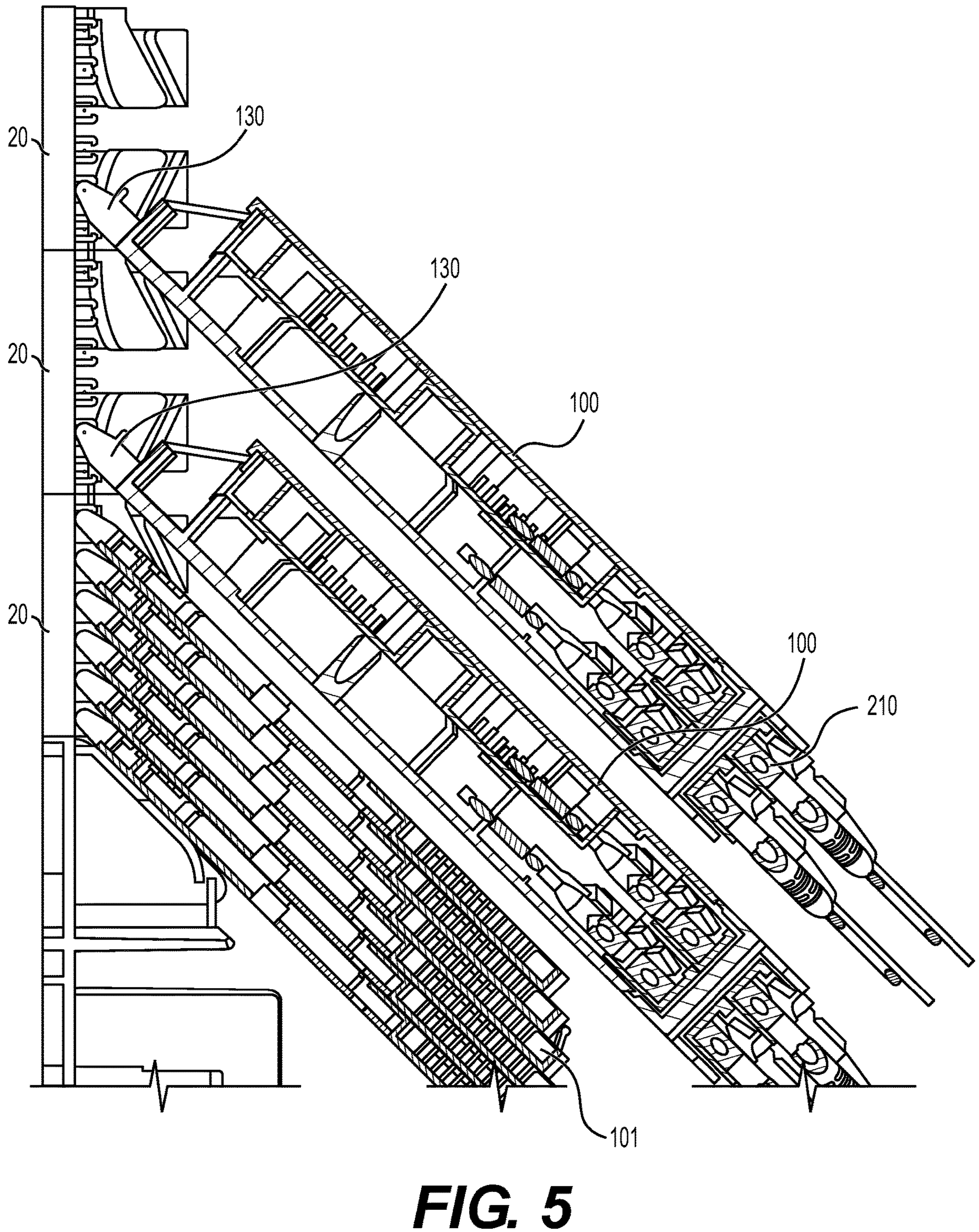
FIG. 5 is a side view of system shown in FIG. 1, with two cassettes shown in a down position.
Figure 6:
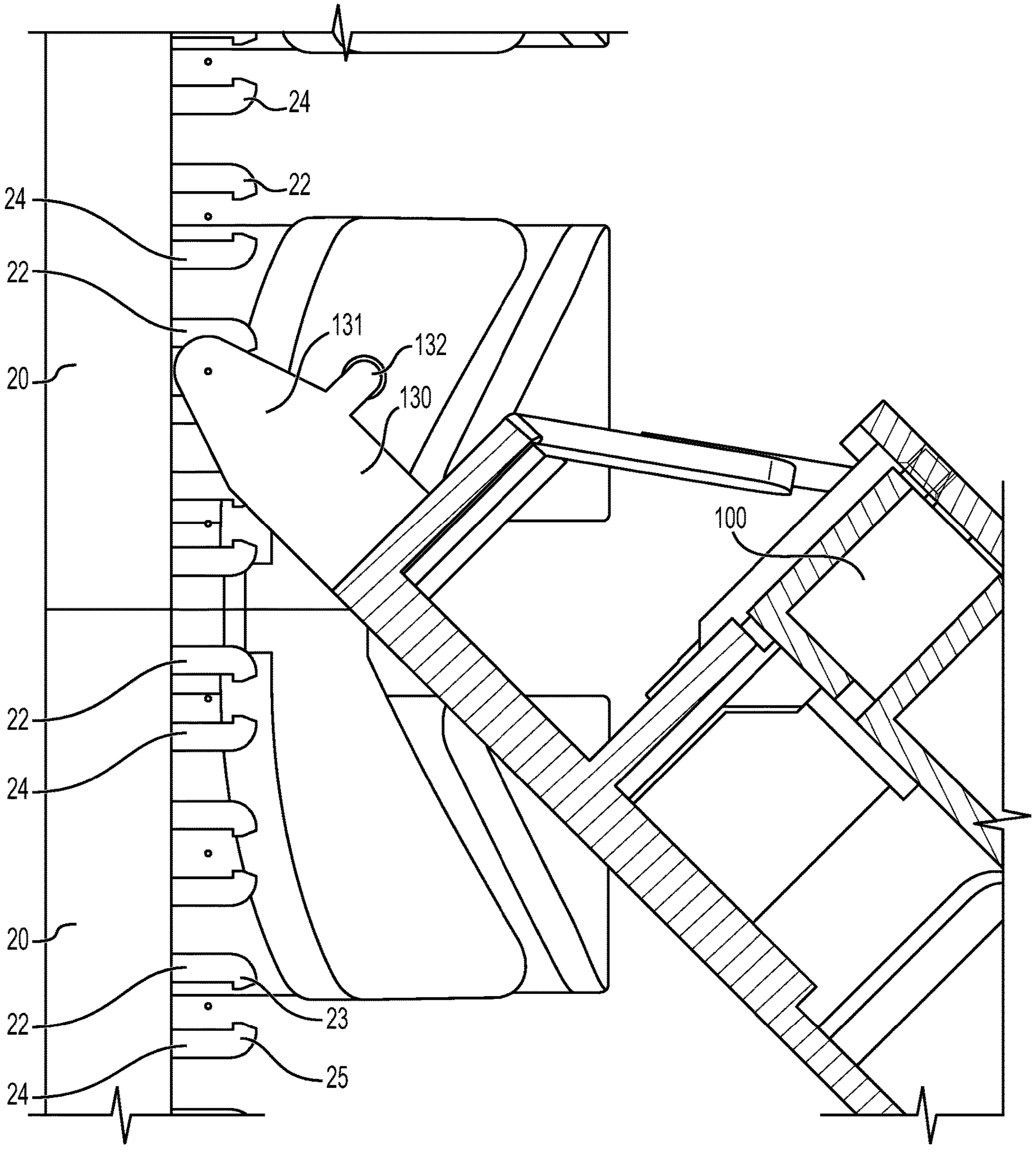
FIG. 6 is a magnified view of an upper one of the two cassettes shown in FIG. 5.

FIG. 5 is a side view of two cassettes 100 and six splice tray modules 101 mounted to mounting plate 20 and in the down position. FIG. 5 shows examples of cassette 100 that are configured to receive two rows of connectors 210. FIG. 6 is a magnified view of a portion of FIG. 5 and shows pivot bar 134 located between tabs 22 and 24. Other pairs of tabs 22 and 24 are shown in FIG. 6 that are not occupied by a pivot bar 134.

Figure 7:
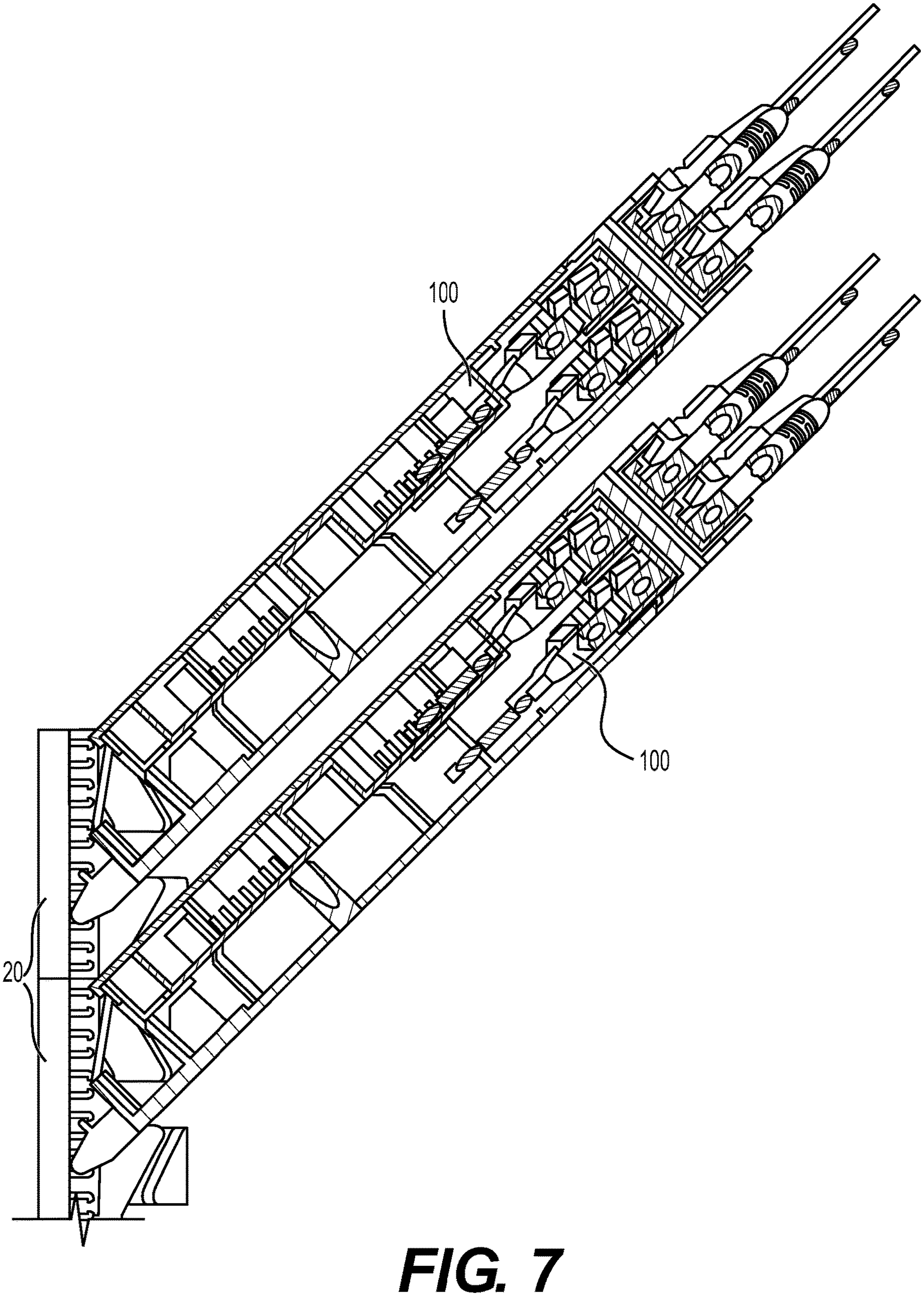
FIG. 7 is a side view of system shown in FIG. 1, with the two cassettes shown in an up position.
Figure 8:
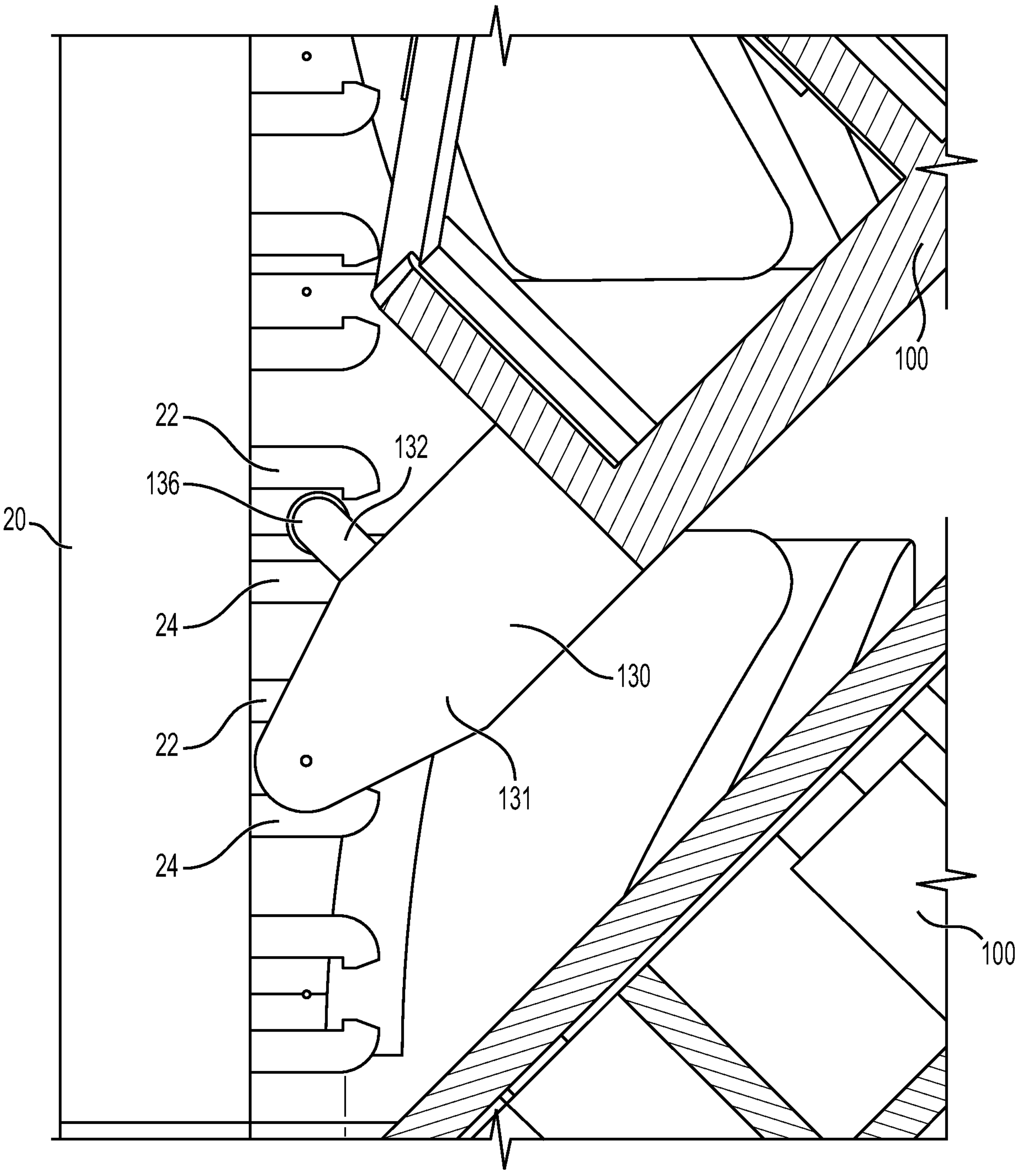
FIG. 8 is a magnified view of the upper one of the two cassettes shown in FIG. 7.
Figure 9:
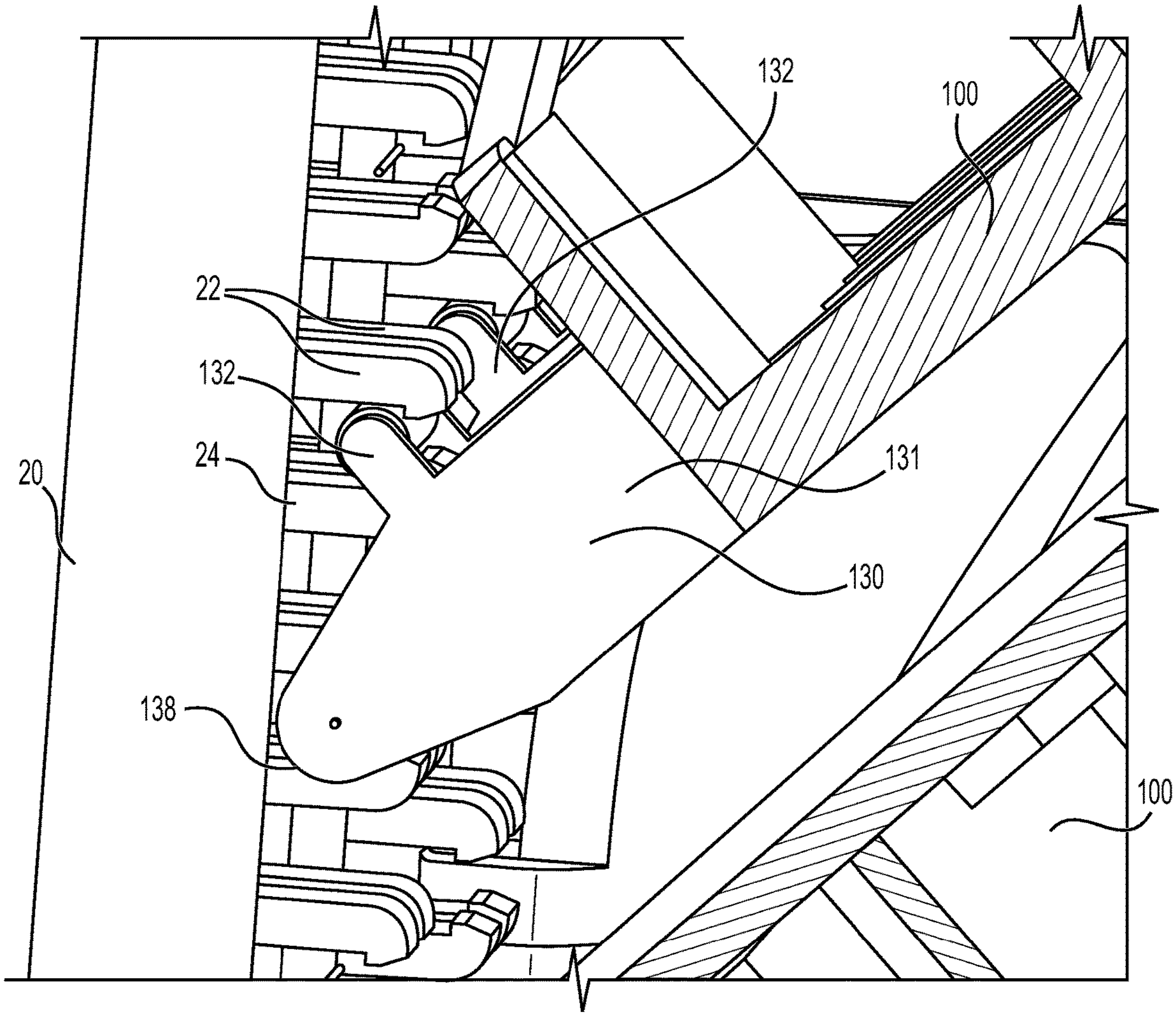
FIG. 9 is a perspective view of the connection shown in FIG. 8.

FIGS. 7 and 8 show two cassettes 100 in the up position with locking bar 136 held between tabs 22 and 24. In this position, ends 23, 25 of tabs 22, 24 prevent locking bar 136 from being pulled out from between tabs 22 and 24 by the weight of cassette 100. However, force exerted by a user can bend ends 23, 25 away from each other to allow locking bar 136 to be removed from between tabs 22, 24 which, in turn, allows cassette 100 to pivot from the up position shown in FIG. 7 to the down position shown in FIG. 5. FIG. 9 is a perspective view of two cassettes 100 in the up position and shows locking bar 136 held between two pairs of tabs 22, 24.

Figure 10:
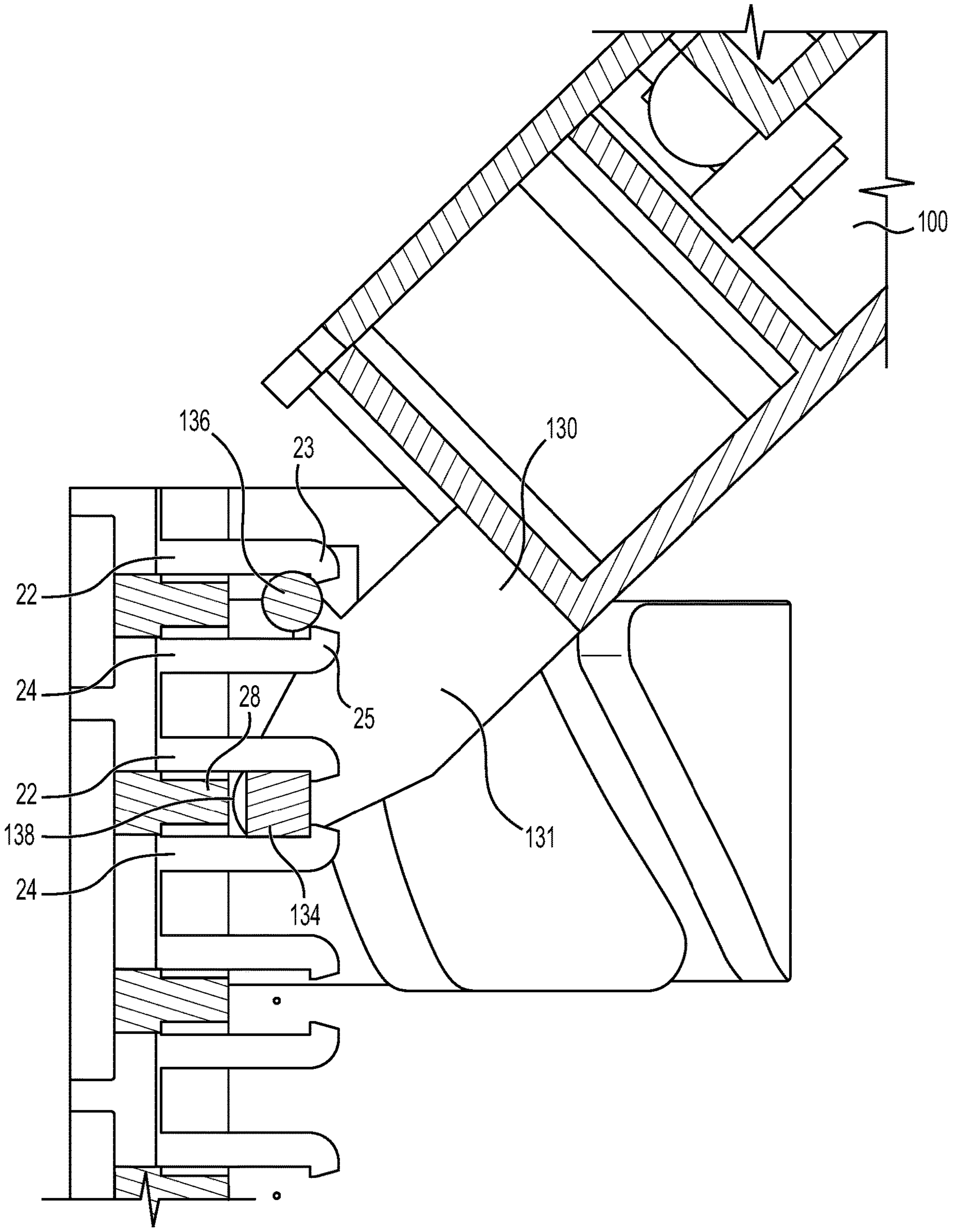
FIG. 10 is a side view of the connection shown in FIG. 8.

FIG. 10 is a side view of cassette 100 in the up position with one side plate 131 removed to show the cross-sectional shapes of pivot bar 134 and locking bar 136. In this example, locking bar 136 is round in cross-section. A round cross-section of locking bar 136 facilitates entry of locking bar 136 between tabs 22, 24, and the removal of locking bar 136 from between tabs 22, 24. While locking bar 136 is shown having a round cross-sectional shape, other shape cross-sections can also be used. In the example shown in FIG. 10, pivot bar 134 is shown having a rectangular cross-section. In particular, pivot bar 134 is shown having a square cross-section. In embodiments, two opposing sides of pivot bar 134 are parallel to, and fully contact, inner surfaces of tabs 22, 24 when cassette 100 is in the up position. The resistance to pivoting provided by the sides of a square pivot bar 134 interacting with tabs 22, 24 is enough to prevent a light cassette or splice tray module from moving from the up position to the down position. However, a heavier cassette, such as cassette 100 that receives connectors 200, 210, may be heavy enough that gravity alone spreads tabs 22, 24 far enough apart to allow pivot bar 134 to rotate such that cassette 100 moves from the up position to the down position. For such heavier cassettes, locking bar 136 provides enough additional resistance to pivoting that cassette 100 stays in the up position until cassette 100 is pulled sufficiently by a user to dislodge locking bar 136 from between tabs 22, 24. In embodiments, the angle of the flat sides of the rectangular cross-section of pivot bar 134 relative to a longitudinal axis of cassette 100 is the angle of cassette 100 in the up position. In embodiments, sides of pivot bar 134 are parallel to, and in complete contact with, inside surfaces of tabs 22, 24 while locking bar 136 is in contact with ends 23, 25 of tabs 22, 24, as shown in FIG. 10. With this configuration, cassette 100 is held in the up position by: (1) the resistance to spreading of tabs 22, 24 keeping sides of square pivot bar 134 in full contact with inner surfaces of tabs 22, 24; and (2) the resistance to spreading of tabs 22, 24 keeping locking bar 136 between tabs 22, 24.

In embodiments, movement of pivot bar 134 relative to tabs 22, 24 is limited by an end 138 of side plate 131 contacting a stop 28 of mounting plate 20, as shown in FIG. 10. This interaction prevents pivot bar 134, and thus cassette 100 from moving to the left in FIG. 10 due to gravity acting on cassette 100 while locking bar 136 is held in place by tabs 22, 24.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A fiber optic cable cassette that is structurally arranged to provide enhanced access to a second cassette, comprising:

a cassette body portion structurally arranged to receive an adapter portion;

a connection portion structurally arranged to couple a cassette with a cassette mounting portion such that the cassette is structurally arranged to pivot relative to the cassette mounting portion;

an adapter portion comprising an optical connector that is structurally arranged to optically connect a first optical cable to a second optical cable;

wherein the connection portion comprises a pivot portion that is structurally arranged to be received in a pivot portion receiving portion of the cassette mounting portion;

wherein the pivot portion is structurally arranged to rotate relative to the pivot portion receiving portion such that the cassette is structurally arranged to pivot between a raised position and a lowered position;

wherein the pivot portion is structurally arranged to have a rectangular cross-sectional shape that is structurally arranged to be received by a pair of retaining portions of the pivot portion receiving portion;

wherein the connection portion comprises a locking portion that is structurally arranged to be received in a locking portion receiving portion of the cassette mounting portion;

wherein the locking portion is structurally arranged to be retained by the locking portion receiving portion to retain the cassette in the raised position;

wherein the locking portion is structurally arranged to have a circular cross-sectional shape that is structurally arranged to be received by a pair of retaining portions of the locking portion receiving portion;

wherein the locking portion is parallel to the pivot portion;

wherein the pivot portion receiving portion is identical to the locking portion receiving portion; and wherein the pivot portion and the locking portion are structurally arranged to cooperate to provide a positioning mechanism that is structurally arranged to hold the cassette in the raised position so as to provide enhanced access to a second cassette positioned underneath the cassette.

2. The cassette of claim 1, wherein the adapter portion comprises an adapter plate.

3. The cassette of claim 1, wherein the adapter portion is one of a plurality of different adapter portions.

4. The cassette of claim 1, wherein the cassette further comprises a splice tray mounted to the cassette body portion and structurally arranged to move between an open position and a closed position.

5. The cassette of claim 1, wherein the pivot portion comprises a pivot bar.

6. The cassette of claim 1, wherein the rectangular cross-sectional shape of the pivot portion comprises a square shape.

7. The cassette of claim 1, wherein a first set of opposing sides of the pivot portion are structurally arranged to be parallel to inner surfaces of the pivot portion receiving portion when the cassette is in the raised position, and a second set of opposing sides of the pivot portion are structurally arranged to be parallel to inner surfaces of the pivot portion receiving portion when the cassette is in the lowered position.

8. The cassette of claim 1, wherein the locking portion comprises a locking bar.

9. The cassette of claim 1, wherein the pivot portion receiving portion comprises a first pair of retaining portions that comprise first resilient mounting tabs, and a second pair of retaining portions that comprise second resilient mounting tabs.

10. The cassette of claim 1, wherein a downward turned end of an upper portion of the locking portion receiving portion is structurally arranged to contact the locking portion when the cassette is in the raised position, and an upward turned end of a lower portion of the locking portion receiving portion is structurally arranged to contact the locking portion when the cassette is in the raised position.

11. The cassette of claim 1, wherein the adapter portion is structurally arranged to be attached to and removed from the cassette body portion.

12. The cassette of claim 1, wherein the adapter portion is structurally arranged to receive an external input connector that is structurally arranged to receive an input cable located outside of the cassette, an internal input connector that is structurally arranged to receive an input cable located inside the cassette, an external output connector that is structurally arranged to receive an output cable located outside of the cassette, and an internal output connector that is structurally arranged to receive an output cable located inside the cassette.

13. An optical fiber management portion that is structurally arranged to provide enhanced access to a second optical fiber management portion, comprising:

a body portion structurally arranged to receive an adapter portion;

a connection portion structurally arranged to couple an optical fiber management portion with a mounting portion such that the optical fiber management portion is arranged to pivot relative to the mounting portion;

wherein the connection portion comprises a pivot portion that is structurally arranged to be received in a pivot portion receiving portion of the mounting portion;

wherein the pivot portion is structurally arranged to rotate relative to the pivot portion receiving portion such that the optical fiber management portion is structurally arranged to pivot between a raised position and a lowered position;

wherein the connection portion comprises a locking portion that is structurally arranged to be received in a locking portion receiving portion of the mounting portion;

wherein the locking portion is structurally arranged to be retained by the locking portion receiving portion to retain the optical fiber management portion in the raised position;

wherein the locking portion is parallel to the pivot portion;

wherein the pivot portion receiving portion is identical to the locking portion receiving portion; and wherein the pivot portion and the locking portion are structurally arranged to cooperate to provide a positioning mechanism that is structurally arranged to hold the optical fiber management portion in the raised position so as to provide enhanced access to a second optical fiber management portion positioned underneath the optical fiber management portion.

14. The optical fiber management portion of claim 13, wherein the body portion is structurally arranged to receive an adapter portion.

15. The optical fiber management portion of claim 14, wherein the adapter portion comprises an optical connector that is structurally arranged to optically connect an internal optical cable to an external optical cable.

16. The optical fiber management portion of claim 13, wherein the pivot portion comprises a pivot bar.

17. The optical fiber management portion of claim 13, wherein the pivot portion receiving portion comprises a first pair of retaining portions.

18. The optical fiber management portion of claim 13, wherein the pivot portion has a rectangular cross-sectional shape.

19. The optical fiber management portion of claim 13, wherein the locking portion comprises a locking bar.

20. The optical fiber management portion of claim 13, wherein the locking portion receiving portion comprises a second pair of retaining portions.

21. The optical fiber management portion of claim 13, wherein the locking portion has a circular cross-sectional shape.

22. The optical fiber management portion of claim 13, wherein a first set of opposing sides of the pivot portion are structurally arranged to be parallel to inner surfaces of the pivot portion receiving portion when the optical fiber management portion is in the raised position, and a second set of opposing sides of the pivot portion are structurally arranged to be parallel to inner surfaces of the pivot portion receiving portion when the optical fiber management portion is in the lowered position.

23. The optical fiber management portion of claim 13, wherein the first pair of retaining portions comprise first resilient mounting tabs, and the second pair of retaining portions comprise second resilient mounting tabs.

24. A device for providing enhanced access to an optical fiber management portion that is stacked below another fiber management portion comprising:

an enhanced optical fiber management portion comprising:

a pivot portion that is structurally arranged to rotate relative to a pivot portion receiving portion such that the optical fiber management portion is structurally arranged to pivot between a raised position and a lowered position;

a locking portion that is structurally arranged to be retained by a locking portion receiving portion to retain the optical fiber management portion in the raised position;

wherein the pivot portion receiving portion is identical to the locking portion receiving portion;

wherein the locking portion is parallel to the pivot portion; and wherein enhanced optical fiber management portion is structurally configured to provide enhanced access to a second optical fiber management portion positioned underneath the optical fiber management portion by structurally arranging the pivot portion and the locking portion to cooperate with one another to provide a positioning mechanism that is structurally arranged to hold the optical fiber management portion in the raised position so as to provide enhanced access to the second optical fiber management portion.

25. The optical fiber management portion of claim 24, wherein the pivot portion comprises a pivot bar.

26. The optical fiber management portion of claim 24, wherein the pivot portion receiving portion comprises a first pair of retaining portions.

27. The optical fiber management portion of claim 24, wherein the pivot portion has a rectangular cross-sectional shape.

28. The optical fiber management portion of claim 24, wherein the locking portion comprises a locking bar.

29. The optical fiber management portion of claim 24, wherein the locking portion receiving portion comprises a second pair of retaining portions.

30. The optical fiber management portion of claim 24, wherein the locking portion has a circular cross-sectional shape.

31. The optical fiber management portion of claim 24, wherein a first set of opposing sides of the pivot portion are structurally arranged to be parallel to inner surfaces of the pivot portion receiving portion when the optical fiber management portion is in the raised position, and a second set of opposing sides of the pivot portion are structurally arranged to be parallel to inner surfaces of the pivot portion receiving portion when the optical fiber management portion is in the lowered position.

* * * * *